3,255,076
METHOD FOR THE CONTROL OF NEMATODES
Edward D. Weil, Lewiston, and Edward Leon, Tonawanda, N.Y., assignors to Hooker Chemical Corporation, Niagara Falls, N.Y., a corporation of New York
No Drawing. Filed Nov. 12, 1963, Ser. No. 323,078
6 Claims. (Cl. 167—22)

This invention relates to a new and useful method for the control of harmful nematodes in the soil by the use of octachloropropane.

In accordance with the present invention octachloropropane is introduced into nematode-infested soil in nematocidal amounts. This results in the destruction of all or a large proportion of the nematodes. Further, by interposing a suitable waiting period of only one or a few weeks crop plants can be gown in the treated soil without phytotoxic effects. Also, no tarpaulin or other surface seal is needed during the fumigation.

It is known that soil can be fumigated to control nematodes using methyl bromide or chloropicrin, but due to the high volatility of these compounds a tarpaulin cover must generally be used, and the cost of such fumigation is prohibited for all but the highest value soil (such as seed beds). Soil fumigation for nematode control can be carried out using dichloropropene and dichloropropane, however, high rates (typically two hundred or more pounds per acre) of these compounds are required for nematode control.

It is thus an object of the present invention to make available economic and effective methods for the control and destruction of nematodes in soil. These and other objects will become apparent from a reading of the description herein.

The applicant has found that octachloropropane possesses a high degree of activity against nematodes. This material is more effective than other lower alkanes partially substituted by halogen such as dichloropropane, dichloropropene, heptachloropropane and hexachloropropene. Octachloropropane is a white waxy solid, melting at 150 degrees centigrade when pure and having a penetrating odor, resembling moth crystals. It is a known chemical and may be readily prepared by the chlorination of propane or propylene mixtures containing propane. One known synthesis among several is described in United States Patent 2,492,941.

In accordance with this invention, octachloropropane may be employed in pure form or in a technical degree of purity, as well as in admixture with related compounds. One of its advantages is that it is a solid, unlike the known soil fumigants, such as methyl bromide. Being a solid it may be conveniently applied by hand, by use of a fertilizer spreader or by a seed planter. For such application the compound may be prepared as granules or pellets and it may be diluted by admixture with or absorption on solid carriers, such as clay, silica, sawdust and the like. It may be introduced into the nematode infested soil either in unformulated conditions or in various formulations.

Such formulations may include solutions in solvents such as petroleum fractions, xylenes, carbon tetrachloride, ethylene dichloride, trichloroethylene, chlorobenzene or the like. It is particularly economical to employ a solvent which itself contributes soil nematocide activity, for example ethylene dibromide, 1,2-dibromochloropropane, 1,2-dichloropropane, 1,3-dichloropropene or the commercial "DD" nematocide mixture which comprises a crude 1,3-dichloropropene/1,2-dichloropropane mixture. A further aspect of our invention is the finding that combinations of octachloropropane with about 2 to about 100 parts by weight of 1,3-dichloropropene pure or in the form of "D-D mixture" (a commercial mixture of 1,3-dichloropropene and 1,2-dichloropropane) exhibit a greater than additive nematocidal action.

Such solutions in organic solvents can be further admixed with water by the use of surface active agents such as emulsifiers listed in McCutcheon, Detergents and Emulsifiers (1962 Ed.). Suitable solid formulations include granular formulations on a solid carrier, which can be clay, fertilizer granules, vermiculite, ground corn cobs, tobacco stems or any suitable solid.

The formulations may contain other pesticides, for example, other nematocides such as tetrachlorothiophene. Octachloropropane may be substituted for part of the tetrachlorothiophene in synergistic nematocidal mixtures of tetrachlorothiophene with 5 to 200 parts of 1,3-dichloropropene or D-D mixture. The formulations may also contain insecticides such as DDT, dieldrin, aldrin, endrin, endosulfan, benzene hexachloride, lindane, parathion, dimethoate, thimet, zinophos, other insecticidal phosphates, insecticidal N-methylcarbomates, and the like.

The method of application may be by surface spraying or spreading followed by a mixture with the soil such as by plowing under, discing or other mechanical means, or by washing into the soil by means of water (especially where the formulation contains an emulsifier). Even without specific efforts to effect admixture with the soil, some pesticidal benefits will occur from surface applications such as a degree of downward soil penetration by the heavy vapors of the octachloropropane which apparently sublimes. A particularly effective and economical method of application is to spray or pour the chemical into an open furrow and then to close the furrow. By use of suitable equipment a furrow may be opened, pesticide run into the furrow, and the furrow closed up in one continuous operation. Such furrow applications are known as row treatments and are found to permit greatly reduced amounts of octachloropropane to be employed. This technique is particularly suited to the cultural methods employed with tobacco and cotton, i.e. row crops wherein the planting is done in prepared rows.

The process of this invention may be practiced by applying from 2 to 200 pounds per acre. The higher range from 20 to 200 pounds is preferred when "broadcast" treatment is used (i.e. where all the soil in the field is treated). The lower range from about 2 to 20 pounds per acre is surprisingly effective where row treatment is utilized. This effectiveness of low rates is surprising since prior art nematocides when applied in row treatments still require about one-third the rate which they require in broadcast treatments. A very low rate such as 2 to 20 pounds per acre of octachloropropane is effective particularly in admixture with 1,3-dichloropropene (pure or as "D-D" mixture) at 20 to 500 pounds of the latter per acre in row treatment, the combined effect being greater than the sum of the effects of the two components.

After the chemical is applied, a waiting period should be interposed before planting the crop. This period will range from one to several days in the case of low rates, insensitive crops, and warm porous sandy soils, up to several months (at most six months) in the case of high rates, sensitive crops or cool sorptive soils. A typical waiting period is three days to one month. The waiting period permits the octachloropropane to escape from the soil. It will be obvious to one skilled in this art that the exact rate to be used in any given case will depend upon the season, soil type, weather conditions such as temperature, crop tolerance, pests to be controlled, completeness of control desired, economic limitations, and other practical factors. In terms of concentration in the soil, activity is observed in the range down to about 2 parts of chemical per million parts of soil and rates up to 500 parts per million or above may be used.

Actual illustrations of some of the modes of formulating the product as well as the herbicidal results obtained appear in the examples which follow.

In the specification, the examples and claims the parts are by weight and the temperatures are in degrees centigrade unless otherwise specified.

Example 1

A liquid formulation of octachloropropane is produced by mixing the following,

Compound: Parts by weight
Octachloropropane _____ 5
Xylene _____ 5

The ingredients are stirred together to make a clear solution. The formulation is admixed (by discing) with nematode infested soil at 150 pounds of octachloropropane per acre, the treated soil being transplanted with tomatoes three weeks later. The tomatoes are found to grow normally and are free of root knot disease.

Example 2

A synergistic nematocidal formulation is prepared by admixing the following:
Compound: Parts by weight
Octachloropropane _____ 10
"D-D mixture" (1,2-dichloropropane-1,3 - dichloropropene mixture) _____ 90

This mixture is applied at 50 pounds per acre into furrows which were then covered over. Two weeks later tobacco plants are planted into the treated rows. Complete control of nematode-caused root knotting of tobacco is observed when the plants are uprooted one month later; by contrast, when each component is used alone at the same rate well under 50 percent control is obtained. Similar results are obtained using 1,3-dichloropropene in the substantially pure form, in amounts equal to its content in the "D-D mixture," in place of the "D-D mixture."

Example 3

An emulsified formulation was made by admixing the following:

Compound: Parts by weight
Octachloropropane _____ 5
Emulsifier (polyoxyethylene ether alkyl (Triton B) aryl sulfonate blend) _____ 2
Xylene _____ 8

The clear mixture is emulsifiable with water and is employed as in Example 1.

Example 4

Pots of soil infested with *Meloidogyne incognita* var. *acrita* (a nematode species which causes root knot disease of various crops) were admixed with octachloropropane at rates of 0.25 and 0.5 gram per gallon of soil treated. Various related chemicals were also applied in comparison tests. After two weeks cucumber seedlings were planted in the treated soil. After another week the seedlings in the treated soil were examined and the degree of nematode-caused root damage (root knotting) was rated on a scale of 0 to 3; on this scale, 0 equals no damage, 1–2 equals moderate damage of increasing severity, 3-extreme damage comparable to untreated comparison tests. The results are shown in the following table.

| Compound | Rate (g./gallon soil) | Root knot index |
|---|---|---|
| 1,2,3-trichloropropane | 0.5 | 1.0 |
| Polychloropropane, sp. gr. 1.515* | 0.5 | 1.5 |
| Polychloropropane, sp. gr. 1.537** | 0.5 | 3 |
| "D-D" mixture (1,2-dichloropropane-1,3-dichloropropene mixture) | 0.5 | 3 |
| Octachloropropane | 0.5 | 0.0 |
| Octachloropropane | 0.25 | 0.0 |

*A mixture of $C^3H^4Cl^4$ and $C^3H^5Cl^3$.
**A mixture of $C^3H^4Cl^4$ and $C^3H^3Cl^5$.

Example 5.—Broadcast application

Soil infested with *Meloidogyne incognita* (a species of nematode which causes root knot disease of various crops) was admixed with octachloropropane at the rate of 60 pounds per acre to a depth of about 6 inches. Three weeks later, tobacco seedlings were planted in the treated soil, and were found to develop normally with no incidence of root knot disease. Adjacent similarly infested soil which was not treated with the chemical was planted with tobaco at the same time, and in this soil the plants which developed were stunted and their root systems heavily infested with nematodes as manifested by the presence of numerous knots or galls on the roots.

Example 6.—Row application

A nematode-infested field was prepared for tobacco planting by opening furrows 42 inches apart, applying the nematocide as a 20 percent solution of octachloropropane in 1,2-dichloropropane-1,3-dichloropropene mixture ("D-D mixture") at the rate of 10 pounds of octachloropropane per acre, and covering the furrows over to produce hills. Two weeks later, tobacco seedlings were transplanted into the hills. The tobacco plants when examined after a further month of growth were found to have normal healthy root systems, free of nematode damage.

The use of the solvent alone at the same gallonage produced less than 20 percent reduction of root knotting compared to an untreated check plot.

It will be recognized by those skilled in the art that various modifications within the invention are possible, some of which have been referred to above. Therefore we do not wish to be limited except as defined by the appended claims.

What is claimed is:
1. A method of protecting crops from nematodes which comprises treating nematode infested soil with a nematocidal amount of octachloropropane.
2. A method in accordance with claim 1 wherein the octachloropropane is applied at the rate of between 2 and 200 pounds per acre.
3. A method for protecting row crops from nematodes comprising opening a furrow, applying octachloropropane in the furrow at a nematocidal rate, closing the furrow, waiting until the octachloropropane escapes from the treated soil and planting the crop into the rows thus treated.
4. The method of claim 3 wherein the rate employed is from about 2 to 20 pounds of octachloropropane per acre.
5. The method of claim 3 wherein octachloropropane is applied at from 2 to 20 pounds per acre in admixture with about 20 to 500 pounds of 1,3-dichloropropene per acre.

6. A method of protecting crops from nematodes which comprises treating nematode infested soil with a nematocidal amount of octachloropropane, and after permitting the octachloropropane to escape from the soil, planting crops in the treated soil.

References Cited by the Examiner
UNITED STATES PATENTS
3,093,472  6/1963  Homeyer _____ 167—22

JULIAN S. LEVITT, *Primary Examiner.*

STANLEY J. FRIEDMAN, *Assistant Examiner.*